J. L. CHESNUTT.
STRINGPROOF ROLLER BEARING WHEEL.
APPLICATION FILED APR. 30, 1921.
1,432,966.   Patented Oct. 24, 1922.
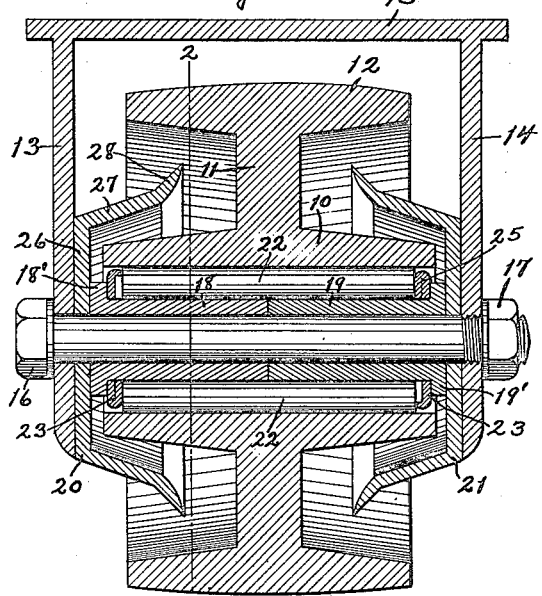
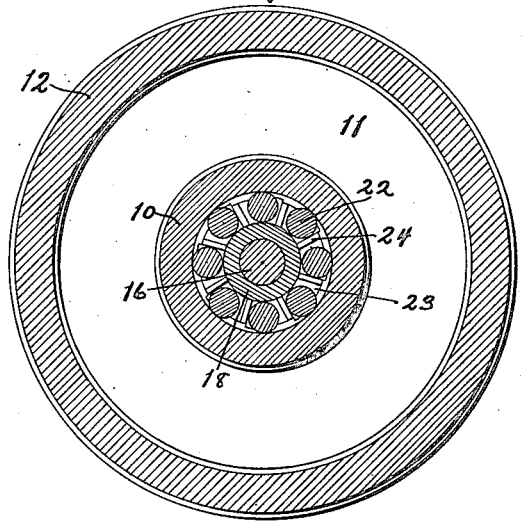
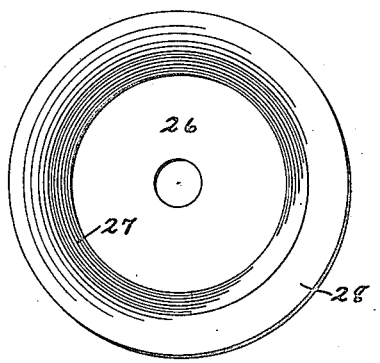
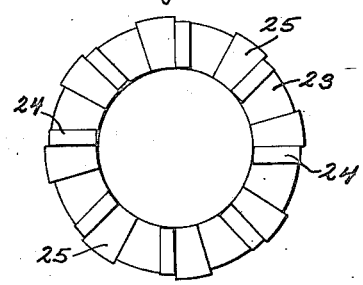
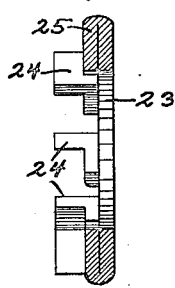
INVENTOR:
J. L. CHESNUTT
By Earl M. Sinclair
Atty.

Patented Oct. 24, 1922.

1,432,966

UNITED STATES PATENT OFFICE.

JOHN LOUCIEN CHESNUTT, OF LONG BEACH, CALIFORNIA.

STRINGPROOF ROLLER-BEARING WHEEL.

Application filed April 30, 1921. Serial No. 465,885.

*To all whom it may concern:*

Be it known that I, JOHN LOUCIEN CHESNUTT, a citizen of the United States of America, and resident of Long Beach, Los Angeles county, California, have invented a new and useful Stringproof Roller-Bearing Wheel, of which the following is a specification.

The object of this invention is to provide an improved construction for a roller-bearing wheel having string-proof features.

A further object of this invention is to provide an improved anti-friction wheel for casters and the like, which is efficient, easy-running, inexpensive to manufacture and assemble.

A further object of this invention is to produce an improved anti-friction wheel which is easily separable for the purpose of renewing worn or broken parts.

A further object of this invention is to provide an improved anti-friction wheel having bell-shaped string guards or shields at each end of the anti-friction devices to prevent accumulation of strings or threads between the stationary and movable parts and within the anti-friction devices.

A further object of this invention is to provide an improved and inexpensive spacer for roller bearings.

With these and other objects in view, my invention consists in the construction, arrangement and combination of elements hereinafter set forth, pointed out in my claims and illustrated by the accompanying drawing, in which—

Figure 1 is a vertical section of a wheel embodying my improvements. Figure 2 is a vertical section at right angles to Figure 1 and on the line 2—2 thereof. Figure 3 is an elevation of one of the string guards detached. Figure 4 is an inside elevation and Figure 5 a cross-section of one of the roller spacers removed from the structure.

In the construction of the device as shown the wheel proper is formed with a hub 10 having a bore of relatively large diameter, a web 11 formed on and at the central portion of said hub, and a tread 12 on said web, preferably relatively wide and extending in both directions a material distance from said web in overhanging relation to the hub. The wheel may be mounted in any suitable support such as a wheel yoke or fork having spaced parallel wings 13, 14 joined at their upper ends by a plate or top member 15. The wings 13, 14 are apertured to receive a bolt 16, and the aperture of one of said wings preferably is tapped or interiorly threaded to receive the threaded portion of said bolt, a nut 17 being screwed on the threaded portion of the bolt outside of and in contact with said wing and serving as a lock nut. Spacing sleeves 18, 19 are mounted end to end on the bolt 16 within the bore of the wheel hub and between the wings 13, 14. At times the sleeves 18, 19 may be formed in one member extending from one of the wings to the other if desired and permitted by the construction of the other parts and the process of assembling employed. String guards or shields, of generally bell-shape, are mounted on the bolt 16 and in contact with the inner faces of the wings 13, 14. The guards or shields are designated generally by the numerals 20, 21, and their construction and function is hereinafter more fully set forth. The structure comprising the wings 13, 14, guards 20, 21 and spacing sleeves 18, 19 is rigid and relatively immovable, the parts being drawn tightly together by the threading of the bolt 16 in the wing 14. The spacing sleeves 18, 19 may at times be formed at their outer ends with peripheral flanges 18′, 19′ contacting with the inner faces of the guards 20, 21 respectively. A series of anti-friction rollers 22 are mounted in the space between the spacing sleeves 18, 19 and the inner surface of the hub 10 of the wheel and provide an anti-friction bearing for said wheel.

I find it desirable to keep the rollers 22 spaced from each other circumferentially of the sleeves, and to this end have provided spacing disks 23, one at each end of the assembly of rollers. Each disk 23 is of annular form so that it may be mounted loosely and be free to rotate on the sleeve 18 or 19, and is formed with a series of radially arranged ribs or flanges 24 on its inner face, spaced apart sufficiently to receive the ends of rollers 22 between successive ribs or flanges and preferably allowing slight freedom of movement of said rollers therebetween. As shown the spacing disks 23 are formed of metal by stamping and pressing, which produces a double thickness of metal at 25 between the successive ribs or flanges 24; but it is obvious that they may well be formed by casting, particularly in the larger sizes. The spacing disks 23 are cheap and easily made, and it is their function to separate the rollers in their rolling travel, and thus decrease friction and wear.

Each of the string guards 20, 21 is formed with a plane or flat base 26 adapted to be pressed firmly and rigidly into contact with the inner face of a wing 13 or 14, with a frusto-conical rim or shell 27 extending from the periphery of said base, and with a peripheral flange 28 extending at an obtuse angle from the outer margin of said rim or shell. When assembled the base 26 is spaced from the adjacent end of the hub 10, the rim or shell 27 extends inwardly at least half the distance toward the median line of the wheel and embraces and is sufficiently spaced from an outer end portion of the hub so as to provide the proper clearance for rotation, and the flange is directed outwardly toward the tread 12 of the wheel. As shown clearly in Figure 1, the rim or shell and the flange thereof extend within the space toward the web 11 of the wheel and between the hub and overhanging tread, and thus the guard provides an effective closure for the open ends of the hub and a protection to the members contained therein. When threads or strings are picked up by the tread of the wheel in travel they are drawn upon and over the shell or rim portion 27 of one of the guards, and the inclined or tapered construction thereof tends to cause such strings or threads to be forced outwardly toward the wings 13 or 14, and subsequently to be wrapped around one of said wings, from which they can be easily removed and where they cause no harm or trouble. The flanges 28 of the guards, at obtuse angles to the shells or rims, provide stops which prevent the strings or threads from being drawn inwardly toward the wheel, and by projecting outwardly toward the rim or tread 12 further assist in closing the movable parts against foreign substances. The members of the guards may be extended as close as desired to the web and the inner surface of the tread 12 but must be spaced therefrom sufficiently to provide clearance for rotation of the wheel. The guards also serve to prevent the entrance of dust and the like to the interior of the wheel, which is raised or picked up by the tread of the wheel in travel.

If desired the spacing sleeves may be formed without the flanges 18′, 19′, but they assist in assembling the roller bearings and in holding the guards firmly against the wings, and out of contact with the wheel hub, particularly in the case of wheels of small diameter and where the clearance between the shell or flange of the guard and the tread or hub of the wheel is very small.

The device is readily separable by removal of the nut 17 and bolt 16 for the purpose of replacing worn or broken parts, which is of especial advantage in an efficiency caster whose parts are long lived and economically replaceable.

I claim as my invention—

1. A device of the class described, comprising a wheel formed with a hub having a bore, spaced wings between which said wheel is mounted, a bolt extending through said wings and through the bore of said hub, a sleeve flanged at its ends mounted on said bolt within said bore, a series of anti-friction rollers within said bore and concentrically of said sleeve, and separate spacing disks mounted on said sleeve adjacent the flange thereof and formed with ribs or flanges extending between and serving to space apart said rollers.

2. A device of the class described, comprising a wheel formed with a hub, spaced wings between which said wheel is mounted, a bolt extending through said wings and traversing said hub, a sleeve mounted on said bolt within said hub, a series of anti-friction rollers within said hub and concentrically of said sleeve, and guards of bell form on said bolt and within said wings, said guards extending past the vertical planes of the ends of said hub and overhanging but spaced annularly from such end portions.

3. A device of the class described, comprising a wheel formed with a hub and also formed with a web extending radially of said hub and also formed with a relatively wide tread circumferentially of said web and overhanging said hub, spaced wings between which said wheel is mounted, an axle carried by said wings and extending through said hub, anti-friction devices between said axle and the hub, and bell-shaped guards mounted against the inner faces of said wings and extending toward the web of said wheel and into the annular space between the hub and tread thereof, said guards being formed with plane bases pressed into rigid contact with said wings and also formed with rims on said bases enclosing end portions of said hub, said rims being arranged on obtuse angles to the bases and having flanges at their inner margins arranged on obtuse angles to said rims and directed toward the tread portion of the wheel.

4. In a device of the class described, a roller-bearing spacer comprising a relatively flat disk of annular form having radially arranged ribs or flanges on its inner face.

5. In a device of the class described, a wheel guard of generally bell-shape comprising a plane base, a rim arranged on and peripherally of said base and at an obtuse angle thereto, and a flange on and peripherally of said rim and at an obtuse angle thereto.

6. A device of the class described, comprising a wheel formed with a hub having a bore, spaced wings between which said wheel is journaled, a bolt axle carried by said wings and extending through the bore of said hub, roller bearings between said bolt axle and the hub, and separate spacing disks mounted concentrically and at each end of said bolt axle and engaging said rollers, whereby adjacent rollers are maintained in spaced relations.

7. A device of the class described, comprising a wheel formed with a hub and also formed with a web radially of said hub and also formed with a tread concentrically of said web, said tread being of greater width than said web and overhanging said hub, spaced wings between which said wheel is mounted, a bolt axle carried by said wings and extending through the wheel hub, a sleeve on said bolt axle between said wings, and bell-shaped guards on end portions of said bolt axle within said wings, said guards embracing and serving to close end portions of said hub, and extending at least one-half the distance from the ends of said hub to said web.

Signed at Des Moines, in the county of Polk and State of Iowa, this 8" day of April, 1921.

JOHN LOUCIEN CHESNUTT.